United States Patent [19]
Ciccarelli et al.

[11] Patent Number: 5,953,509
[45] Date of Patent: Sep. 14, 1999

[54] MULTIPROCESSOR INTERFACE ADAPTOR WITH BROADCAST FUNCTION

[75] Inventors: Larry Ciccarelli, E. Setauket; Robert Pinter, Hauppauge; Kenneth J. Rivalsi, Lake Grove; Bosah Erike, Coram, all of N.Y.

[73] Assignee: Periphonics Corporation, Bohemia, N.Y.

[21] Appl. No.: 08/853,131

[22] Filed: May 8, 1997

[51] Int. Cl.[6] .................................................. G06F 13/00
[52] U.S. Cl. ..................................... 395/280; 395/800.35
[58] Field of Search .................................. 395/280–287, 395/800.35, 800.32

[56] References Cited

U.S. PATENT DOCUMENTS

| | | | |
|---|---|---|---|
| 5,495,188 | 2/1996 | Chen et al. ................................. | 326/93 |
| 5,537,461 | 7/1996 | Bridges et al. ............................ | 379/88 |
| 5,787,119 | 7/1998 | Lamballe et al. ......................... | 375/240 |

*Primary Examiner*—Ayaz R. Sheikh
*Assistant Examiner*—David A. Wiley
*Attorney, Agent, or Firm*—Istrate Ionescu

[57] ABSTRACT

An telephone media processing server is described having clock pulse steering circuit for steering clock pulses to a plurality of digital processors under control of a main processor. Other signals, such as a frame clock, for generating frame pulses, address and data lines are distributed using single conductors connected to output pins of a control processor. Typically, more than eight signal processors partitioned in a plurality of groups are interfaced to a single main processor. Each group of signal processors has a clock input controlled by the clock steering circuit. A main processor has a data port pin, an address port pin, and a switching command output connected to the clock pulse steering means for steering clock pulses to each group of processors. The signal processors set the data pin and address pin to a high impedance when the clock input is inactive. An example using the TMS320C5x processor is detailed.

10 Claims, 4 Drawing Sheets

MULTIPROCESSOR INTERFACE ADAPTOR WITH BROADCAST FUNCTION

DESCRIPTION

1. Field of Invention

The present invention relates to an Telephone Media Processing Server (TMPS) system having a plurality of digital signal processors for telephone signal detection and decoding. In particular, the invention relates to an apparatus and method part of a Telephone Media Processing Server system for interfacing multiple digital signal processors to a control processor, including a broadcast function.

2. Background Art

In general, Telephone Media Processing Server (TMPS) systems facilitate access to database(s) in response to voice and/or touch tone inputs from telephone callers interacting directly with the TMPS. This direct interaction between a caller and the TMPS typically reduces or eliminates the need for human operator intervention between the caller and the database. Consequently, labor costs and errors associated with a telephone operator for assisting a caller during database interaction and queries are reduced. Furthermore, quality of service to the caller is increased, while facilitating 24 hour access to the database.

Servicing of caller requests for database queries requires interface to a plurality of telephone lines by the TMPS for reception of caller data. For example, such well known functions as touch tone decoding, generation, and echo cancellation are implemented in an TMPS to allow data to be communicated by a caller. These functions can be performed for example, by a general purpose, dedicated digital signal processor, such as supplied by Texas Instruments, designated, for example, by model numbers in the TMS320C5x family.

The use of multiple, intercommunicating TMS320C5x processors through a serial time division multiplexed (TDM) data path, as described in the prior art, is limited to a group of up to eight processors. This limitation arises from the processors' internal address decoding structure. This eight processor maximum grouping is described in Texas Instruments' manual titled User's Guide for Digital Signal Processing Products, Number 2547301-9721, rev D, (January 1993), copyrighted by Texas Instruments, 1992, incorporated herein by reference in its entirety. As described on page 5-35 of the cited User's Guide, the 'C5X type of digital signal processors (DSPs) have a Time Division Multiplexed (TDM) serial port that allows a typical 'C5X device to communicate serially with up to seven other 'C5X devices. In accordance with this teaching in the cited guide, forming a bus structure to accommodate the specified requirements for the TDM serial port allows the interconnection of a maximum of eight devices in one group.

Sometimes, TMPS applications require more than eight DSPs to be interfaced to one control processor for operation with multiple telephone lines. Furthermore, it is desired to minimize the number of instructions from the single control processor to all DSPs for common operations to be performed by the DSPs, such as, for example, reset operations and self test. Minimizing the total number of instructions to be transmitted to a plurality of DSPs saves processing time in the control processor.

It is therefore an object of this invention to interface more than eight processors to a single control entity, such as a control processor, thereby teaching away from the eight device limit thought by the prior art.

Yet another objective of the present invention is to permit broadcasting of control commands from a single control processor to more than one grouping of eight digital signal processors, thereby teaching away from the eight device limit thought by the prior art.

SUMMARY OF THE INVENTION

An Telephone Media Processing Server (TMPS) system is described having a main processor, such as a Motorola MPC860, with storage means for digital instructions and data (CD-ROM, hard drive). The system also allows for a large processor, such as a Sun SPARC unit, for PCM sample analysis and feature extraction, as well as more than eight digital signal processors of the type TMS320C5x manufactured by Texas Instruments.

A multiconductor digital bus is connected to the main processor, large processor and digital signal processors. This bus typically carries pulse-code modulated signals (PCM) exchanged between the telephone lines, digital signal processors, main processor and large processor.

A means for interfacing and remotely programming the main processor from a station having a human compatible interface capability is also provided. For example, a Local Area Network interface is provided for the command and control of the TMPS.

The TMPS permits both analog and digital connections from the telephone network (PSTN). For the analog interface, analog to digital (A/D) converters are provided for digitizing analog signals received on a plurality of telephone lines to first digital signals. Digital telephone network connections are interfaced directly to the digital bus. These first digital signals (PCM) are placed on the multiconductor digital bus. These first digital signals are directed along the PCM bus to all digital signal processors (DSPs) in accordance with instructions from the main processor. The DSPs decode telephone signaling related signals contained within the first digital signals into telephone network protocol events, an example of processed signals.

Also, the first digital signals are directed along the PCM bus to the large processor for feature extraction and further decoding.

Another hard drive or other mass storage means is provided for storing digital signals representative of voice features for use in replies to queries. The large processor chooses which voice features to retrieve from storage, and places them on the PCM bus for transmission to the telephone interface and onto the telephone lines.

In combination with above, a clock generator for generating clock pulses, clock pulse steering means for steering clock pulses to a plurality of steered clock outputs, and a frame clock generator synchronized to the clock generator are provided.

The signal processors are grouped in a plurality of groups, each of the signal processors having a clock input, a frame input, a data pin and an address pin. The main processor, using an interface, has a data port pin, an address port pin, and a switching command output connected to the clock pulse steering means for steering the clock pulses to the steered clock outputs. During operation, while the signal processors are not selected, i.e. their TDM address decode register is not active, the signal processors place the data pin and address pin in a high impedance state.

The data pins and address pins of each of the signal processors are connected to the data port pin of the main processor for exchanging serial data information between the main processor and the signal processors.

The frame inputs of the signal processors are connected to the frame clock generator for transmitting frame pulses to the DSPs.

Clock inputs of DSPs for each group (or module) of DSPs, in the plurality of groups, are connected to form a plurality of group clock inputs corresponding to the number of DSP groups. Now, each of the group clock inputs is connected to one of each of the steered clock outputs from the clock pulse steering means. This allows connection of clock pulses from the clock pulse generator to each group clock input in response to commands from the main processor applied to the pulse steering means.

Samples of the telephone line signaling signals processed by the digital processors include single and multiple tone detection and generation, and echo cancellation.

DESCRIPTION OF THE ILLUSTRATIVE EMBODIMENT

As required, a description of the best mode to practice the invention is disclosed herein. However, it is understood that the invention in accordance with this description is applicable to other structures where multiple digital signal processors, having three state devices on output pins, and high impedances on the input pins, are controlled by a single entity. Consequently, the specific and structural details described herein are only representative of the invention while deemed to give the best mode to practice the invention and provide a basis for the claims attached hereto which define the scope of the invention.

Figure 1A:
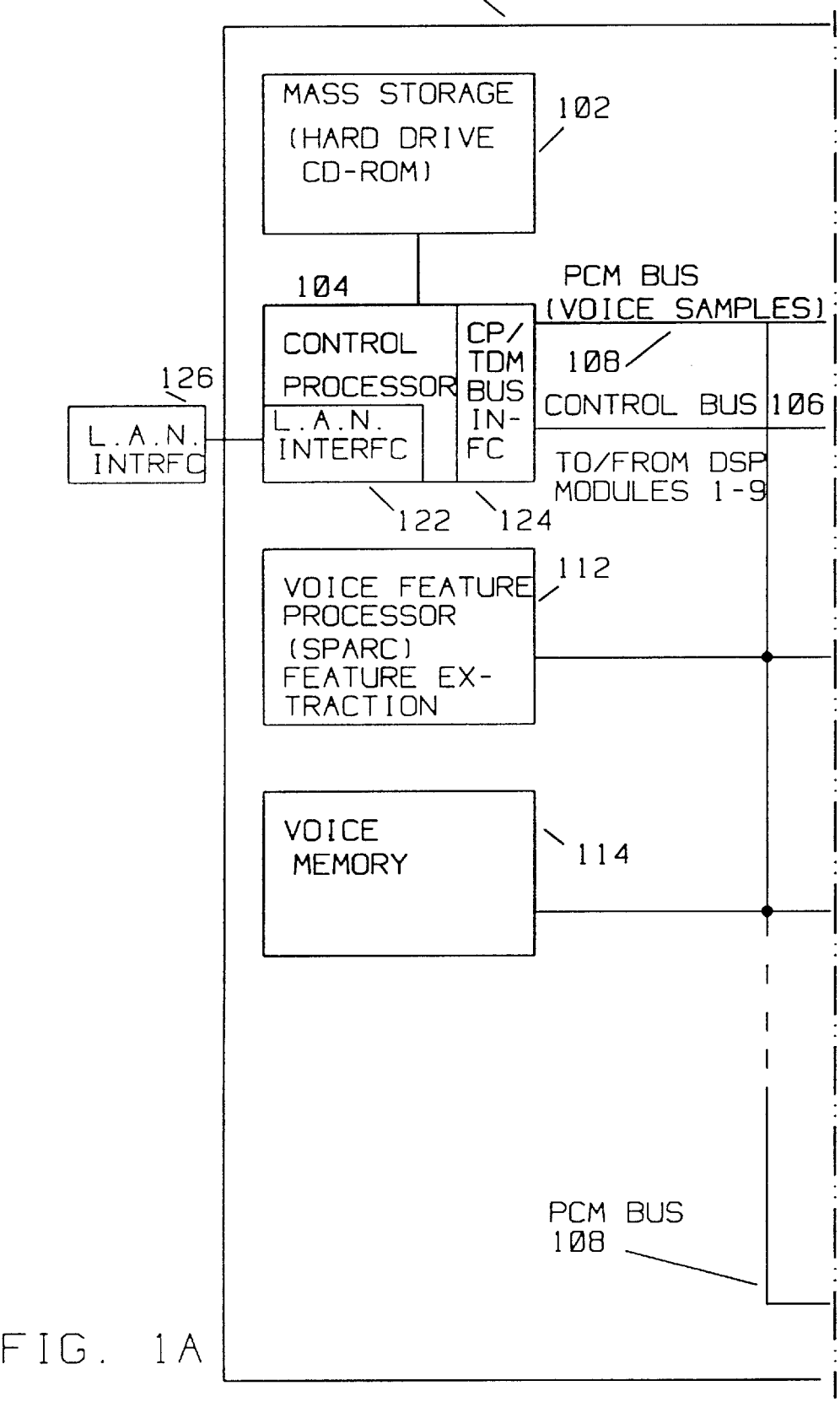
FIGS. 1A and 1B is a Telephone Media Processing Server (TMPS) system having more than eight digital signal processors, in accordance with the present invention.
Figure 1B:
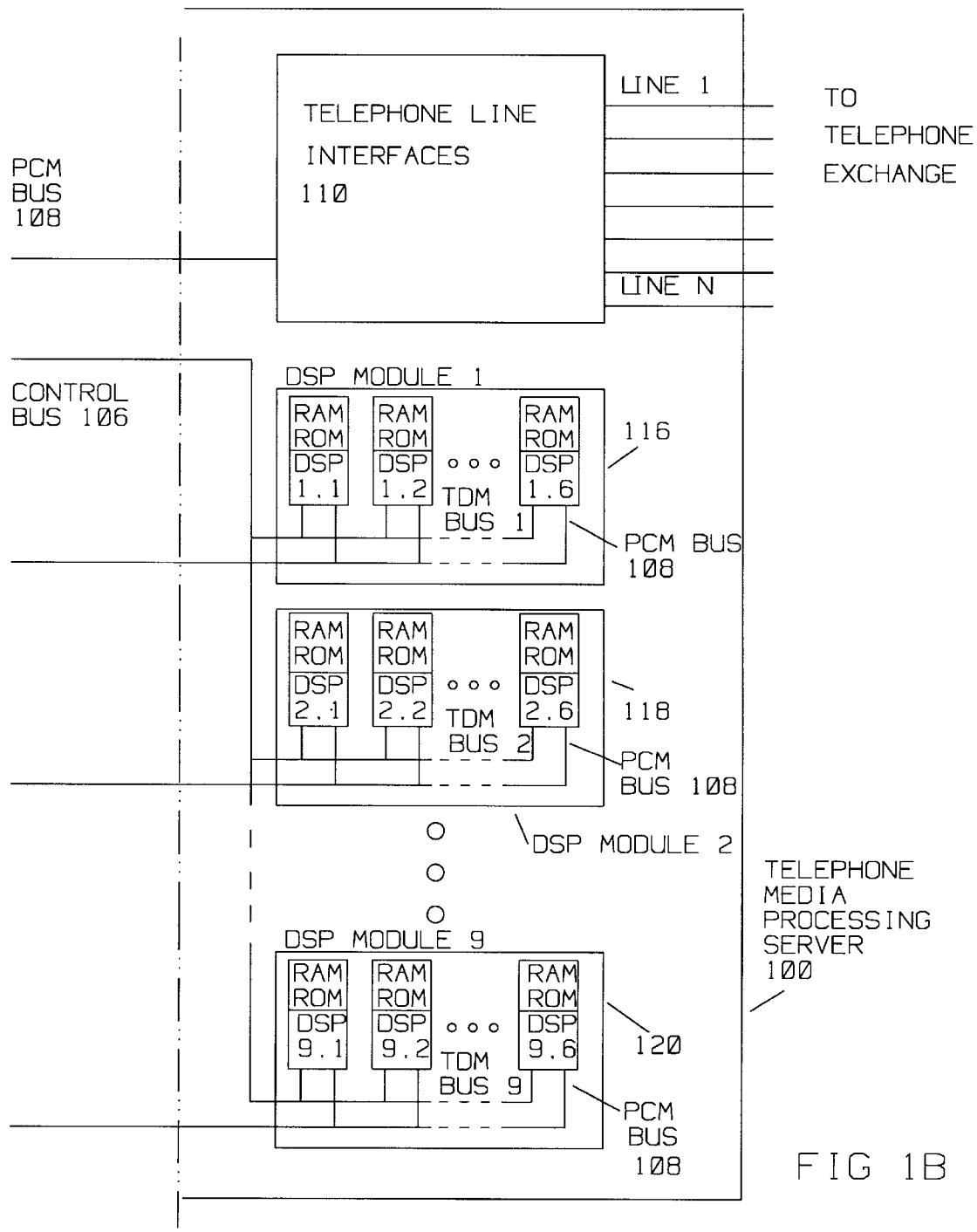

Referring to FIG. 1, Telephone Media Processing Server (TMPS) System 100 has a mass storage means 102 such as, for example, a hard drive, CD-ROM, or other non-volatile storage device for storing control and data in digital form for use by Control Processor (CP) 104, typically a Motorola Inc. part number MPC860. CP 104 has a Local Area Network (LAN) interface 122 connected to it. LAN interface 122 allows for the remote command and control of CP 104. LAN interface 122 communicates with another LAN interface 126. LAN interface 126 is part of a LAN, not part of the TMPS, sometimes located remotely from CP104, and typically comprising a work station having human compatible interface capability, such as a video screen and keyboard.

Control processor-TDM bus interface 124 interfaces the signals from control processor 104 to tine PCM bus 108 and control bus 106. This interface function is generally implemented in a field programmable gate array, as, for example, manufactured by XILINX, Ca.

Telephone line interfaces 110 convert analog voice and tones detected on telephone lines 1 through N, connected to the local telephone exchange, into Pulse Coded Modulation (PCM) samples, representative of signals present on telephone lines 1 through N. Digital telephone connections are passed directly. N can range from a few to hundreds of telephone lines, depending on caller traffic patterns and transaction type. These PCM samples are placed on PCM bus 108 for subsequent analysis and interpretation in voice feature processor 112, typically a SPARC main board available from SUN Computer Corporation. Also, PCM samples from voice feature memory 114 are re-constituted into voice, tone or other telephone line signals to be placed onto telephone line(s) 1 through N under control of Control Processor 104 and voice feature processor 112. Voice feature processor 112 matches incoming voice features with voice features stored in voice memory 114. This matching function performed in large, voice feature processor 112 comprises a lookup table for providing a voice response to a particular voice feature detected on the PCM bus by either voice feature processor 112, or exemplary 54 digital signal processors, in modules 1 through 9.

PCM signals from telephone line interface 110 are also transmitted to digital signal processor (DSP) modules 1 through 9, exemplified by modules 116, 118, and 120. In each module 1 through 9 are digital signal processors (DSPs) 1 through 6, for a total of 54 digital signal processors within Telephone Media Processing Server (TMPS) 100. The referenced 54 digital signal processors (DSPs) are typically of the type designated by Texas Instruments Incorporated, Houston, Tex., as part number(s) TMS320C5x.

DSP 1,1, and/or DSP 1,6 for example can be programmed to perform the function of echo cancellation or tone decoding and generation from samples arriving or being transmitted on PCM bus 108. The same function(s) can also be assigned to DSP 2,1 through 2,6 and/or DSP 9,1 through DSP 9,6, in any combination by transmitting the proper control commands using control bus 106 from CP 104. Each DSP can be assigned a group of PCM samples for analysis corresponding to data derived from any telephone line 1 through N. Each DSP 1,1 through 9,6 has random access memory (RAM) for use as temporary storage of data, program steps and/or intermediate results as well as read only memory (ROM) containing (hard wired) program steps to be executed by each DSP in response to control commands from CP 104. TDM busses 1 through 9, part of each 6 DSP module 1 through 9, are combined into a single control bus 106 containing control messages (TDAT), address information (TADD), clock (TCLK) and frame start (TFRM) as shown in FIG. 2, below.

Figure 2:
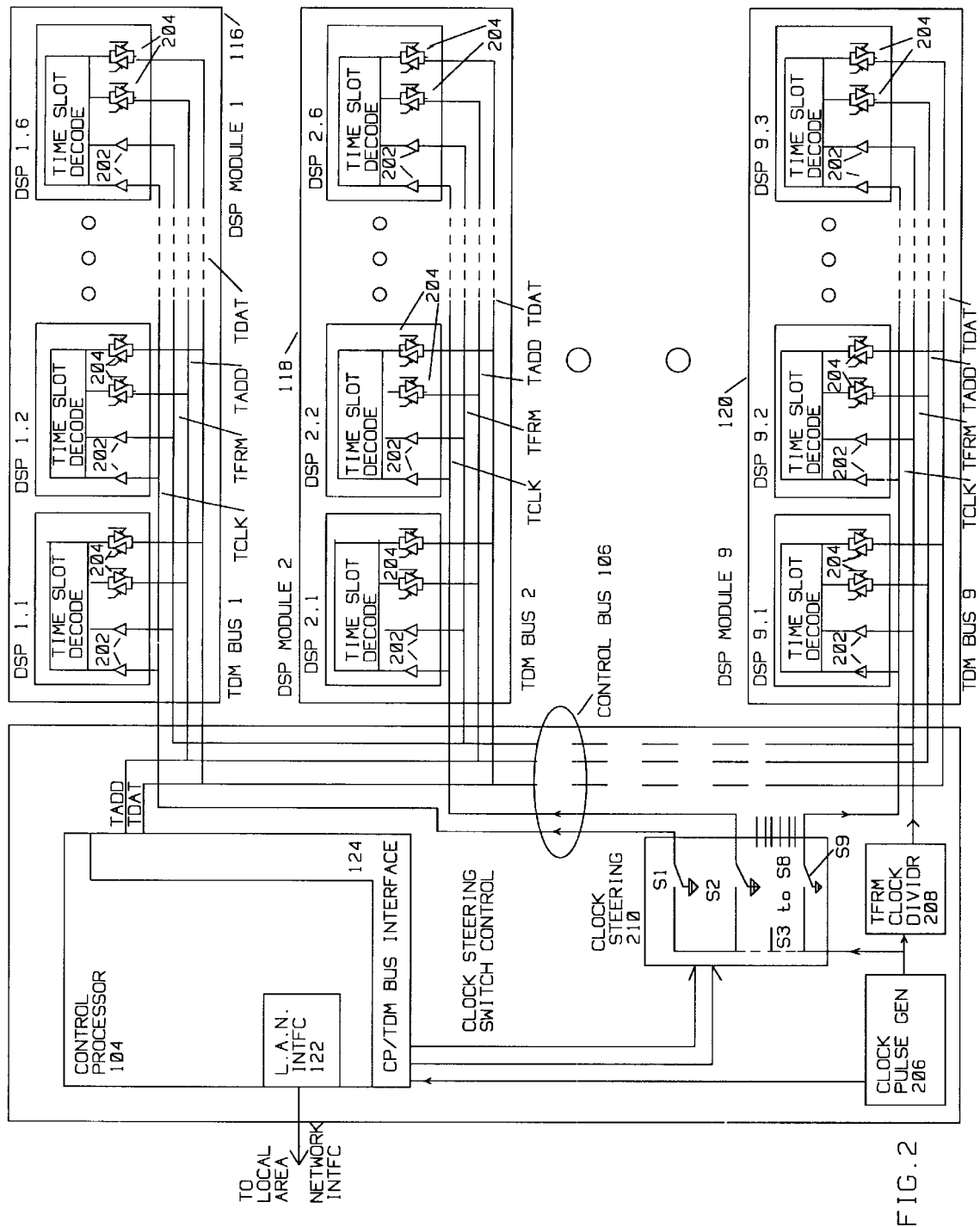
FIG. 2 is multiprocessor interface adaptor using a time division multiplex bus internal to the TMPS system of FIG. 1, in accordance with the present invention.

In FIG. 2, the reference numerals assigned to the structures referenced and discussed in FIG. 1 have been preserved. In FIG. 2, each DSP is shown to have circuitry to detect its slot on the TDM bus. The time slot decode logic is synchronous and is thus only active when a clock signal (TCLK) is supplied. A high impedance input such as 202 responsible for detecting the TCLK and TFRM inputs with minimal circuit loading. The TADD and TDAT pins have tri-state devices associated with them, such as device 204, where the state of digital device 204 can be either zero (low), one (high) or "open" circuit. In the open circuit condition, the impedance presented by a DSP with an "open" condition on one of its pins is very high, with negligible effect on the state of control bus 106 electrical performance or power requirements connected to the pin. Bus 106 is formed by connecting a) TADD pins(single wire) from all DSPs, including DSP 1,1 through DSP 9,6;

b) TDAT pins (single wire) from all DSPs, including DSP 1,1 through DSP 9,6;

c) TFRM inputs (single wire) from all DSPs, including DSP 1,1 through DSP 9,6;

d) TCLK inputs (single wire) from each group of six DSPs, or DSP module.

Within each DSP module, all TCLK inputs are tied together. Therefore, in the example shown, there are nine TCLK wires within control bus 106.

In this example, therefore, in accordance with FIG. 2, bus 106 has three copper conductors allocated to TADD, TDAT and TFRM signals respectively, and nine conductors allocated to TCLK1, TCLK2 . . . TCLK9 connected to each of nine DSP modules. Each local TDM bus within a DSP module, TDM bus 1, TDM bus 2 . . . TDM bus 9 has only four conductors, designated TADD,TDAT,TFRM and TCLK.

Tri state output stages, used on the TDAT and TADD pins of this invention, are well known in the art and described, for example, in "Digital Integrated Electronics" by Taub and Schilling, ISBN 0-07-062921-8, incorporated herein by reference.

The control of the state of tri state devices 204 is dependent on a clock signal being present at the TCLK input of a particular DSP. For example, if no TCLK1 signal is present, and the decode logic is inactive at DSP 1,1, then devices 204 within DSP 1,1 are in their "open" circuit, high impedance state, precluding any interaction with TADD and TDAT signals present on TDM bus 1. Conversely, if a clock signal exists at the TCLK1 input of DSP 1,1, and the time slot decode logic is active, as well as a TFRM1 signal, then TADD and TDAT signal pins of DSP 1,1 can send data, synchronized to TCLK pulses as further detailed in FIG. 3. If however, the decode logic is inactive, the DSP can receive data. Another way of summarizing the circuit in FIG. 2, is that all single conductor TDAT pins from all 54 DSP's (DSP Modules 1 through 9) are connected together electrically to form a continuous electrical conductor between all 54 TDAT pins of the DSPs. Similarly, the TADD pins are connected to form a continuous electrical path between all 54 TADD pins of the DSPs. All 54 TFRM4 inputs are also tied together electrically. The TCLK inputs however, are connected only within one DSP module, such as 116, 118 and 120, forming signal lines TCLK1, TCLK2 . . . TCLK9, sent to clock steering 210 via bus 106, where each of the nine TCLK signal lines can be individually connected either to signal ground or to the output of clock pulse generator 206 by switches S1 through S9, respectively.

The copper conductor, or transmission line, interconnecting the 54 TADD pins is connected to CP 104 "address write" output (TADD) pin, using interface circuitry contained in CP/TDM Bus Interface 124. The copper conductor, or transmission line, interconnecting the 54 TDAT pins is connected to to CP 104 "command write" output pin (TDAT) again using interface circuitry in CP/TDM Bus Interface 124. TADD and TDAT data are interfaced to CP 104, typically via a field programmable gate array supplied by XILINX Corporation, Ca.

Clock divider 208 generates a TFRM signal, conducted via the connection to all 54 DSPs concurrently. The clock divider operates independently of the state of processor 104, or DSPs in Modules 1 through 9. A buffer output in divider 208 can handle the current requirements of the TFRM inputs 202 of all 54 processors. Control processor 104 does not have an input controlling the TFRM signal to the DSPs. CP 104 interfaces with CP/TDM bus interface 124 which sends and receives data on TADD and TDAT in synchronism with clock pulse generator 206 since it operates directly from it. Clock pulse generator 206 also synchronizes TFRM clock divider 208. The TFRM signal occurs, for example, in this embodiment every 128 TCLK cycles. In the alternative, if other than the exemplary TMS320C5x processors used herein are used, for larger or smaller systems, to accommodate various frame sizes, the TFRM signal can be every $2^N$ TCLK cycles, where N is greater than 4.

Clock steering unit 210 is controlled by CP 104 to close any one of the switches S1 through S9. The command from CP 104 for closing switches S1 through S9 determines the transmission of clock signal from Clock pulse generator 206 to only those modules 1 through 9 corresponding to the particular closed switch S1 and/or S2 and/or S3 through S9. Hence, DSPs located in DSP modules 1 through 9, corresponding to closed switches S1 through S9 will be enabled to react to data generated by CP 104 at the TADD and TDAT pins.

In general, the switches in clock steering 210 connect the clock input from clock pulse generator 206 to any one of nine clock inputs to module (or group) 1 through 9. When not connected to the clock input, switches 1 through 9 connect the clock lines associated with them to ground to avoid and minimize false signals. For example, S1 is a switch connecting TCLK from DSP module 1, item 116, to two possible positions, either the clock pulse generator 206 or ground. Similarly S2 connects DSP module 2, item 118, to either ground or clock. The same applies to S3 to module 3 (not shown), S4 to module 4 (not shown) etc. As with S1, S9 connects DSP module 9, item 120 to either the clock signal or ground. Typically the clock signal is 4.192 Mhz, but can be scaled up to 33 Mhz or higher, depending on the performance level of the processors. In general, clock steering 210 as well as clock pulse generator 206 and TFRM clock divider 208 are part of an FPGA.

Figure 3:
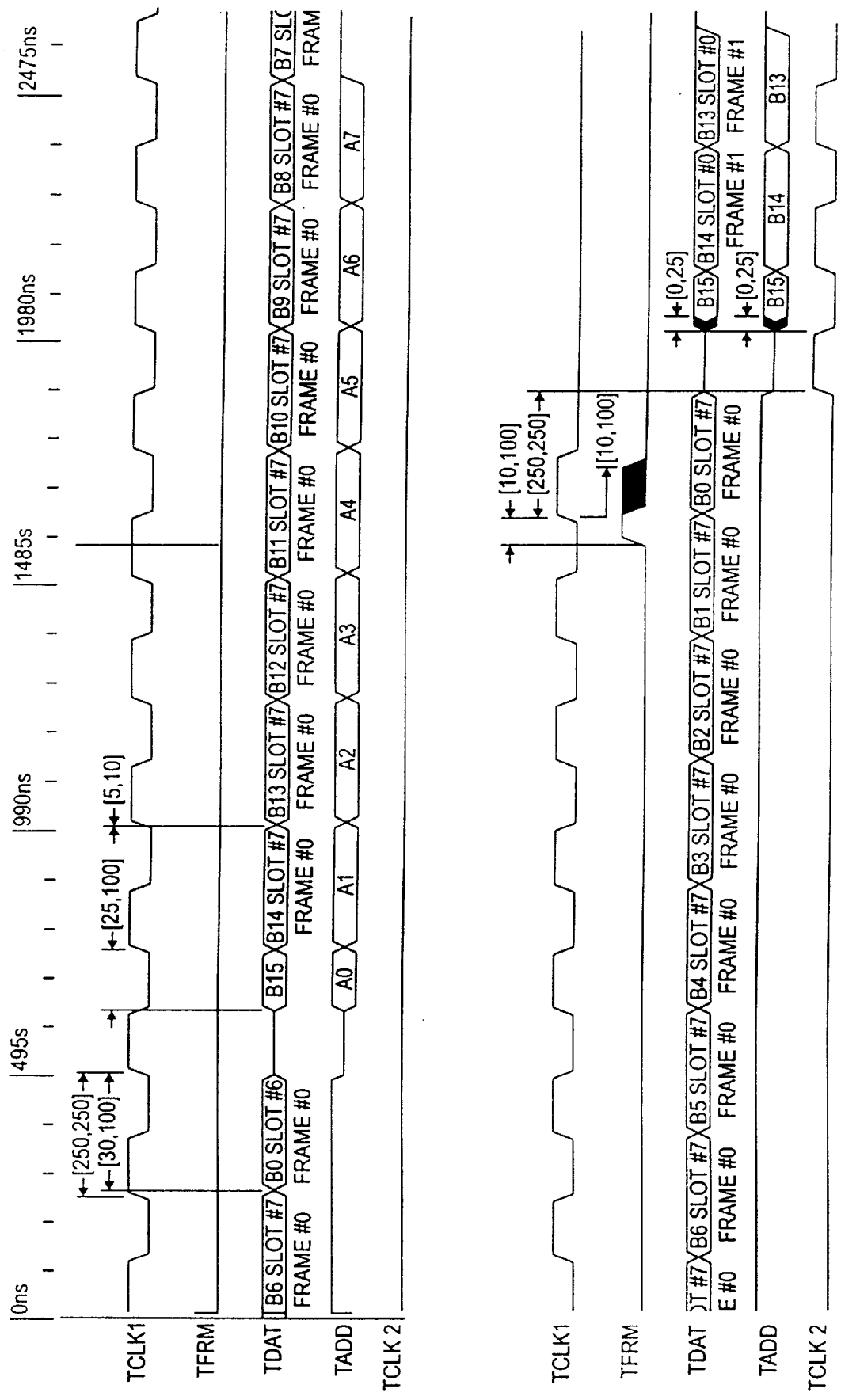
FIG. 3 is a timing diagram for the relevant digital signals for an exemplary operation of this invention.

FIG. 3 shows the timing diagram for bus 106 of FIG. 1, interconnecting DSP modules 1 through 9 to control processor 104 using CP/TDM Bus Interface 124 for signal translation between CP 104 and each of the signals required by DSP modules 1 through 9. As described above, bus 106 is a multiple conductor, typically copper, bus containing these four types of signals, each allocated to a separate conductor within the bus, TADD, TDAT, TFRM and TCLK.

a) TCLK1, TCLK2, TCLK3 . . . TCLK9 describe to clock inputs for each of modules 1 through 9 (or groups of digital signal processors) as switched by clock steering 210 under command from CP 104 (Only TCLK1 and TCLK2 are shown in FIG. 3). The presence of TCLK1 at DSP module 1 is defined by the closing of a switch S1 clock steering 210 and defines whether a "frame" defined by TFRM below can initiate. Hence, the presence, or absence, of TCLK can be viewed as defining a super set of a frame (super-frame). FIG. 3 shows TCLK1, and TCLK2 being either "one" or "zero", indicating that the frame structure, defined by TFRM is not changed. While TCLK1 is disabled, or at logic "zero", and the time slot decode logic is inactive, the DSP module driven by TCLK1 will have its data and address pins in the high impedance (tri-state) condition, hence be unable to read or write on the bus 106, nor present a significant load to the sender attempting to write a message to the TDAT pin. TCLK is distributed to each DSP module in the system via a single, low impedance conductor or matched impedance transmission line. All TCLK pins of DSPs in a particular module are connected to this low impedance conductor.

b) TFRM describes the frame signal required by the processors to initiate the decode cycle in relation to address and data reception. Generally, a TFRM pulse is output every 128 clock pulses and distributed to all processors DSP 1,1 to DSP 9,6 of the system via a single, low impedance TFRM conductor or matched impedance transmission line. In FIG. 3, TFRM is shown to define the start of a new frame. In this embodiment, one frame has 8 slots, with 16 bits of data each, for a total of 128 bits, related to 128 clock pulses and is associated with limitations within the TMS320C5x devices used as an example herein. With processors other than the exemplary TMS320C5x used herein, frame length can be increased above 128 clock pulses to accommodate additional DSPs.

c) TDAT describes data to be transmitted from CP 104, via interface 124, to any one of DSP 1,1 through DSP 9,6 using a single conductor wire interconnecting all DSP's and the data pin of CP 104 (as translated electrically by CP/TDM Bus Interface 124) via a single, low impedance conductor or matched impedance transmission line. The 128 TCLK pulses between TFRM pulses allows 16 data bits (serial) for each of eight time slots to be driven on the TDAT conductor of bus 106. Beginning with slot 0 and with the MSB first, CP 104 drives 16 data bits for each slot, with each bit having a duration of one TCLK cycle (about 247 nsec), with the exception of the first data bit of each slot, which is slightly shorter. The data is driven on the TDAT line on the rising edge of TCLK and is read on the falling edge. A slot corresponds to the time slot a particular DSP is addressed. For example, slot 0, the first slot is used as a spare. Slot 1, corresponds to the time when either DSP 1,1, DSP 2,1 . . . DSP 9,1 can be addressed. Slot 2 corresponds to the time DSP 2,1, DSP2,2 . . . DSP 9,2 can be addressed. Generally, for example, slot seven is assigned to CP 104. Consequently, a DSP can receive during any slot in its particular frame, but can only transmit during its assigned slot 16 bits of serial data on the TDAT line.

d) TADD corresponding to an address signal, identified as A0, A1 . . . A7 in FIG. 3, concurrent with TDAT, is only active during the most significant byte of the TDAT signal. The transmitter on bus 106 drives TADD with the 8 bit transmit address of the recipient of TDAT. As shown, unlike TDAT, TADD is one byte long, is sent LSB first, for the first half of the slot. During the second half of the slot, or about the last eight TCLK periods, the TADD line is driven high. The TADD receive logic samples the TADD line only for the first half of the slot (approximately eight TCLK periods), ignoring it during the second half of the slot. In effect, CP 104 can place either a high or low signal on TADD during this second half of TADD with no adverse consequences using bus 106. TADD is distributed to all DSPs via a single, low impedance conductor or matched impedance transmission line.

As used in FIG. 3, A0, A1 . . . A7 correspond to addresses of each, for example DSP 1,1 through DSP 1,6 in module 1. The same addresses A1, A1 . . . A7 are also applicable to DSP modules 2, 3 . . . 9. Each DSP has in memory its own address, and monitors the TADD pin connected to bus 106 bus in search for this address. Whenever a DSP decodes its address on its TADD pin, it will read the TDAT line to extract the data present there. In this invention, CP 104 can address each individual DSP, for example DSP 1,1 by choosing to transmit the DSP address on TADD in bus 106, then enabling clock steering 210 to send the required clock pulses by closing S1 in clock steering 210, thus transmitting clock pulses to DSP 1,1. Therefore, in this invention, the address of a DSP within a module is defined by the concurrent presence of TCLK as steered by clock steering 210 under control from CP 104 to the particular module, or group of DSPs, (1 through 9), along with TADD, identifying which DSP within the TCLK enabled group is to receive the data on TDAT.

Because of the described structure, a single command from CP 104 can be broadcast from CP 104 to all six DSP's within any one module of six DSPs by enabling the clock line for that particular module (e.g. close any one switch, either S1, S2, . . . S9 in Clock Steering 210 for the duration of a frame), and filling TADD with binary 11111111. In this instance, all six DSPs within the enabled module will decode their own address and read the TDAT information. If TDAT contains the code for example for "reset", all six processors will execute a reset while one command was issued from CP 104. An example of the benefit of such broadcast capability is applicable when commands such as RESET need to be sent to all digital processor during start up. Instead of having to repeat the RESET command 54 times, CP 104 need only transmit it nine times, or once per frame.

Similarly, a broadcast can be limited to any subset of the 6 DSP processors in a module during a particular frame. For example, by selectively activating only some of clock steering's 210 switches, in alternate frames, such as S1 and S2, and placing (binary) 00000001 on the address line, CP 104 can command DSP 1,1 and 2,1 to perform the same function (as specified on the TDAT line) with a two TDAT transmissions. Increasing the number of switches closed in clock steering 210, and/or adding to the number of binary "1"'s in TADD will increase the number of DSPs addressed with a single TDAT data during a single frame.

In view of above description, it will be apparent that the structure described is applicable to other than Texas Instruments' type TMS320C5x digital signal processor and can be effectively used for other processors having similar timing and tri-state impedance characteristics. Furthermore, it will be apparent that while the disclosed embodiment comprises specific elements and configurations, other equivalent structures may be utilized within the scope of this invention. For example, the invention herein is shown for 54 processors, defined by 9 modules of 6 processors each. The same concept can be extended to N processors, where there are K modules, each module having $2^{N}-1$ processors, where N is any integer greater than 3, and K can be arbitrarily large, limited, in general by the number of switches in clock steering 210 and length of the TFRM interval with respect to number of TCLK pulses.

The broadcast function described herein only allows the concurrent addressing of 6 processors in a module to be addressed within a frame. This limitation is particular to the example used herein using the TMS320C5x processors. It is envisioned that with more advanced processors, all clock lines could be enabled concurrently thereby activating all processors present within a TMPS to receive data with a single write command. In effect, it is envisioned that with different processor technology, all 54 processors of the present example can be addressed concurrently with a single command during a single, expanded frame.

Accordingly, the scope of this invention is as described by the claims attached hereto.

What is claimed is:

1. An telephone media processing server system comprising:

a clock generator for generating clock pulses;

clock pulse steering means for steering said clock pulses to a plurality of steered clock outputs;

a frame clock generator, said frame clock generator synchronized to said clock generator for generating frame pulses;

more than eight signal processors, said signal processors grouped in a plurality of groups, each of said signal processors having a clock input, a TDM decode logic, a frame input, a data pin and an address pin; and a main processor having a data port pin, an address port pin, and a switching command output connected to said clock pulse steering means for steering said clock pulses to said steered clock outputs;

wherein:

said signal processors tri-state said data pin and address pin in a high impedance state when said clock input and said TDM decode logic is inactive;

said data pins of said signal processors are connected to said data port pin of said main processor for exchanging serial data bits between said main processor and said signal processors;

said address pins of said signal processors are connected to said address port pin of said main processor for exchanging serial address bits between said main processor and said signal processors;

said frame inputs of said signal processors are connected to said frame clock generator for transmitting said frame pulses to said signal processors;

said clock inputs of said processors for each group in said plurality of groups are connected to form a plurality of group clock inputs; and each said group clock inputs is connected to one of each of said steered clock outputs from said clock pulse steering means for connecting clock pulses from said clock pulse generator to each of said group clock inputs using said clock pulse steering means, in response to commands from said main processor to said pulse steering means.

2. A telephone media processing server system as described in claim 1 wherein each of said signal processor groups comprises up to seven signal processors.

3. A telephone media processing server system as described in claim 1 wherein each of said signal processor groups comprises up to $2^N-1$ signal processors, for N greater than 3.

4. A telephone media processing server system as described in claim 1 wherein said frame clock generator output a frame pulse every $2^N$ of said clock pulses, where N is greater than 4.

5. A method for broadcasting control commands to a plurality of signal processors from a main processor having a data port pin, an address pin, and a switching command output for transmitting broadcast instructions, in a telephone media processing server system, comprising the steps of:

generating clock pulses;

generating frame clock pulses synchronized to said clock pulses;

grouping more than eight signal processors, each signal processor having a clock input, a TDM decode logic, a frame input, a data pin and an address pin, into a plurality of groups;

connecting said clock inputs of said signal processors in each group into a group clock input;

setting said data pin and address pin in each signal processor to a high impedance when said clock input and said TDM decode logic is inactive;

steering said clock pulses to each group clock input in accordance with instructions received from said switching command output of said main processor;

connecting said data pins of said signal processors to a data port pin of said main processor for broadcasting serial data bits to said signal processors concurrently with said clock pulses;

connecting said address pins of said signal processors to an address port pin of said main processor for broadcasting serial address bits to said signal processors concurrently with said clock pulses; and connecting said frame inputs of said signal processors to said frame pulses for transmitting said frame pulses to said signal processors in synchronism with said clock pulses.

6. An telephone media processing server system comprising:

a main processor having storage means for digital instructions and data;

a large processor having a fixed program embedded in a first read only memory;

more than eight signal processors;

a multiconductor digital bus connected to said main processor, large processor and signal processors;

means for interfacing and remotely programming said main processor from a station having a human compatible interface means;

means for digitizing analog signals received on a plurality of telephone lines to first digital signals for placing on said multiconductor digital bus;

means for directing said first digital signals along said digital bus to said more than eight signal processors in accordance with instructions from said main processor, for decoding by said signal processors of telephone signaling related signals contained within said first digital signals;

means for directing; said first digital signals along said digital bus to said large processor;

means for storing second digital signals representative of analog signals transmitted on telephone lines;

means for retrieving said second digital signals representative of analog signals transmitted on telephone lines from said means for storing said second digital signals in response to information contained in said first digital signals, said means for retrieving said second digital signals controlled by said large processor;

means for placing said second digital signals onto said multiconductor bus;

means for encoding said second digital signals into second analog signals compatible with transmission on said telephone line;

means for injecting said second analog signals onto one or more telephone lines;

a clock generator for generating clock pulses;

clock pulse steering means for steering said clock pulses to a plurality of steered clock outputs;

a frame clock generator, said frame clock generator synchronized to said clock generator for generating frame pulses;

said eight signal processors grouped in a plurality of groups, each of said signal processors having a clock input, a TDM decode logic, a frame input, a data pin and an address pin; and said main processor having a data port pin, an address port pin, and a switching command output connected to said clock pulse steering means for steering said clock pulses to said steered clock outputs;

wherein:

said signal processors tri-state said data pin and address pin in a high impedance state when said clock input and said TDM decode logic is inactive;

said data pins of said signal processors are connected to said data port pin of said main processor for exchanging serial data bits between said main processor and said signal processors;

said address pins of said signal processors are connected to said address port pin of said main processor for exchanging serial address bits between said main processor and said signal processors;

said frame inputs of said signal processors are connected to said frame clock generator for transmitting said frame pulses to said signal processors;

said clock inputs of said processors for each group in said plurality of groups are connected to form a plurality of group clock inputs; and each said group clock inputs is connected to one of each of said steered clock outputs from said clock pulse steering means for connecting clock pulses from said clock pulse generator to each of said group clock inputs using said clock pulse steering means, in response to commands from said main processor to said pulse steering means.

7. A telephone media processing server system as described in claim 6 wherein said decoding of telephone signaling signals by said digital processors includes decoding of touch tone signals.

8. A telephone media processing server system as described in claim 6 wherein said decoding of telephone signaling signals by said digital processors includes echo cancellation.

9. A telephone media processing server system as described in claim 6 wherein said multiconductor bus carries pulse code modulated signals representative of analog signals on said telephone lines.

10. A telephone media processing server system as described in claim 6 wherein said multiconductor bus carries pulse code modulated signals representative of digital signals on said telephone lines.

* * * * *